(12) United States Patent
Maeda

(10) Patent No.: US 10,725,368 B2
(45) Date of Patent: Jul. 28, 2020

(54) LIGHT SOURCE APPARATUS AND IMAGE PROJECTION APPARATUS

(71) Applicant: CANON KABUSHIKI KAISHA, Tokyo (JP)

(72) Inventor: Yuuki Maeda, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/379,927

(22) Filed: Apr. 10, 2019

(65) Prior Publication Data

US 2019/0310540 A1 Oct. 10, 2019

(30) Foreign Application Priority Data

Apr. 10, 2018 (JP) ................. 2018-075096

(51) Int. Cl.
*G03B 21/20* (2006.01)
*G02B 27/14* (2006.01)
*H04N 9/31* (2006.01)
*G02B 5/02* (2006.01)
*G03B 21/00* (2006.01)
(Continued)

(52) U.S. Cl.
CPC ......... *G03B 21/204* (2013.01); *G02B 5/0278* (2013.01); *G02B 27/149* (2013.01); *G03B 21/005* (2013.01); *G03B 21/2073* (2013.01); *H04N 9/3167* (2013.01); *B82Y 20/00* (2013.01); *G02F 1/015* (2013.01); *G03B 21/208* (2013.01)

(58) Field of Classification Search
CPC ............... G03B 21/204; G03B 21/005; G03B 21/2073; G02B 5/0278; H04N 9/3167

USPC .......................................... 353/31
See application file for complete search history.

(56) References Cited

U.S. PATENT DOCUMENTS

2013/0010264 A1 1/2013 Takahashi et al.
2015/0153020 A1 6/2015 Akiyama
(Continued)

FOREIGN PATENT DOCUMENTS

EP 2635934 A1 9/2013
JP 2015106130 A 6/2015
(Continued)

OTHER PUBLICATIONS

Machine Translation of 2016145881 (Year: 2019).*
(Continued)

*Primary Examiner* — Jerry L Brooks
(74) *Attorney, Agent, or Firm* — Carter, DeLuca & Farrell LLP

(57) ABSTRACT

A light source apparatus includes a light emitting element configured to emit light having a first wavelength band, a polarization separation element configured to separate the light having the first wavelength band into a first linear polarization light and a second linear polarization light having polarization directions different from each other, a wavelength conversion element configured to convert the first linear polarization light into a third linear polarization light having a wavelength band different from the first wavelength band, and a combination element configured to combine the second linear polarization light and the third linear polarization light with each other. Light from the light source apparatus maintains a polarization state and illuminates a light modulation element via an illumination optical system.

17 Claims, 10 Drawing Sheets

(51) Int. Cl.
   *G02F 1/015*     (2006.01)
   *B82Y 20/00*     (2011.01)

(56) References Cited

U.S. PATENT DOCUMENTS

| | | |
|---|---|---|
| 2015/0316781 A1 | 11/2015 | Maeda |
| 2018/0095353 A1 | 4/2018 | Ishikawa |
| 2018/0299662 A1* | 10/2018 | Maes ................... G02B 26/008 |

FOREIGN PATENT DOCUMENTS

| | | | |
|---|---|---|---|
| JP | 2016145881 A * | 8/2016 | ............. G03B 21/14 |
| JP | 6084572 B2 | 2/2017 | |
| JP | 2017129733 A | 7/2017 | |
| WO | 2012059931 A1 | 5/2012 | |

OTHER PUBLICATIONS

Partial European Search Report issued by the European Patent Office dated Dec. 11, 2019 in corresponding European Patent Application No. 19167657.6.

J. Hu et al., "Linearly Polarized Emission from Colloidal Semiconductor Quantum Rods," Science, vol. 292, No. 5524, Jun. 15, 2001 (Jun. 15, 2001), pp. 2060-2063, XP055017667, ISSN: 0036-8075, DOI: 10.1126/science.

Extended European Search Report issued by the European Patent Office dated May 6, 2020 in corresponding European Patent Application No. 19167657.6.

* cited by examiner

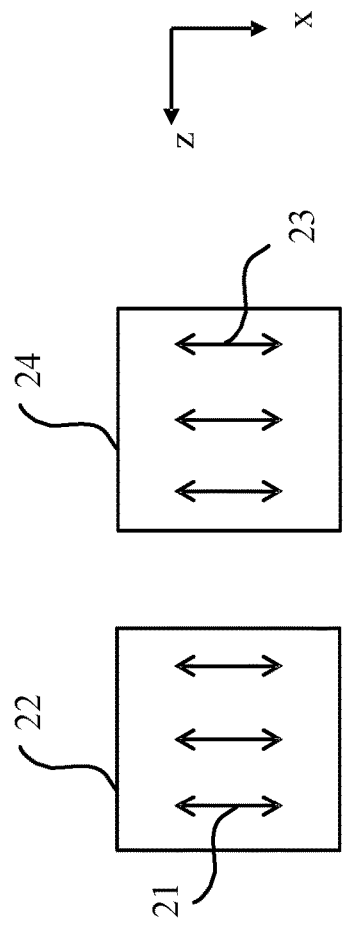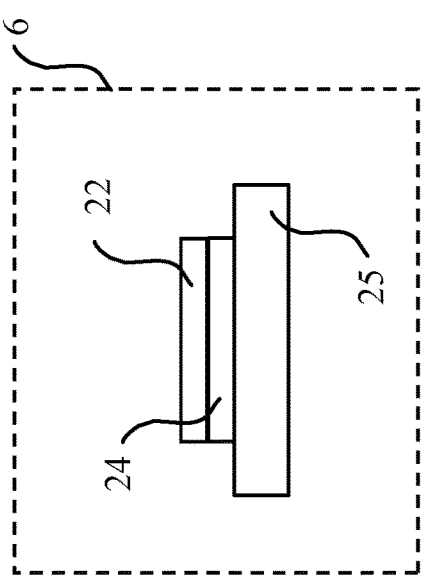
FIG. 2A
FIG. 2B
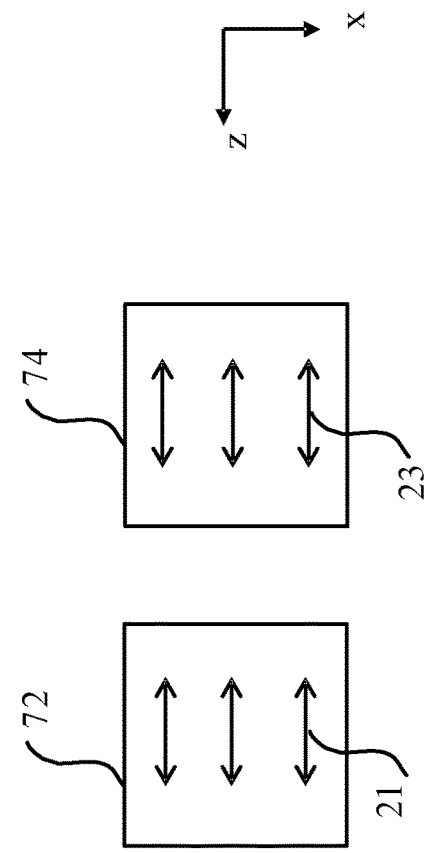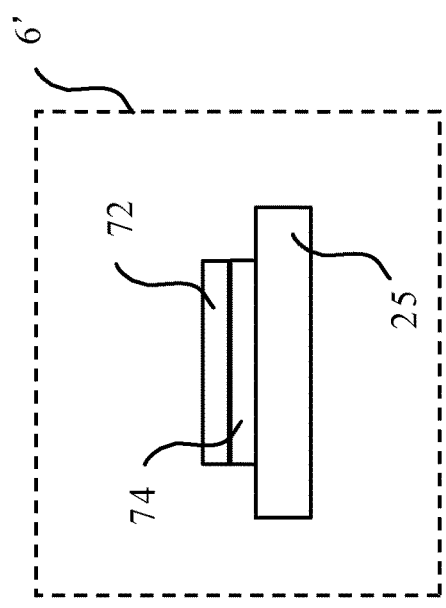
FIG. 3A
FIG. 3B

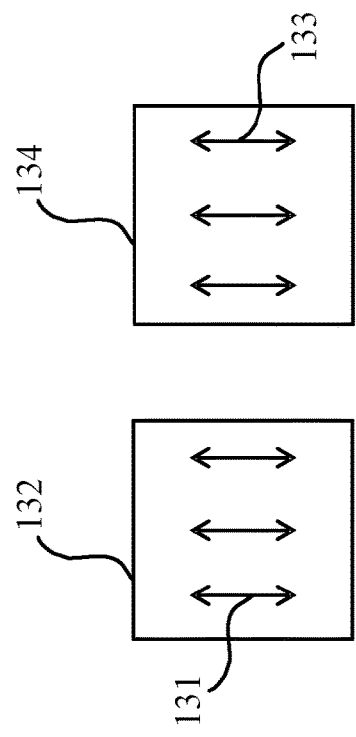
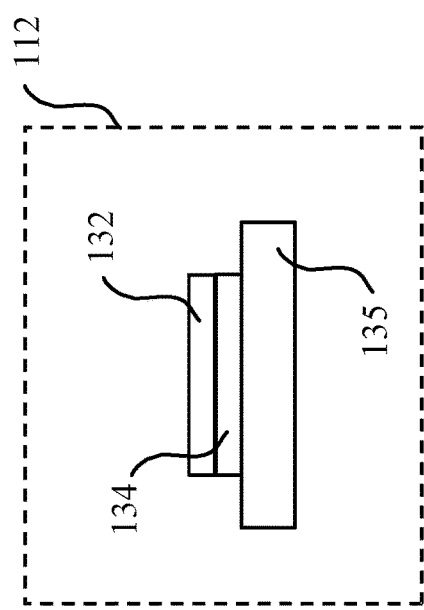
FIG. 5A  FIG. 5B
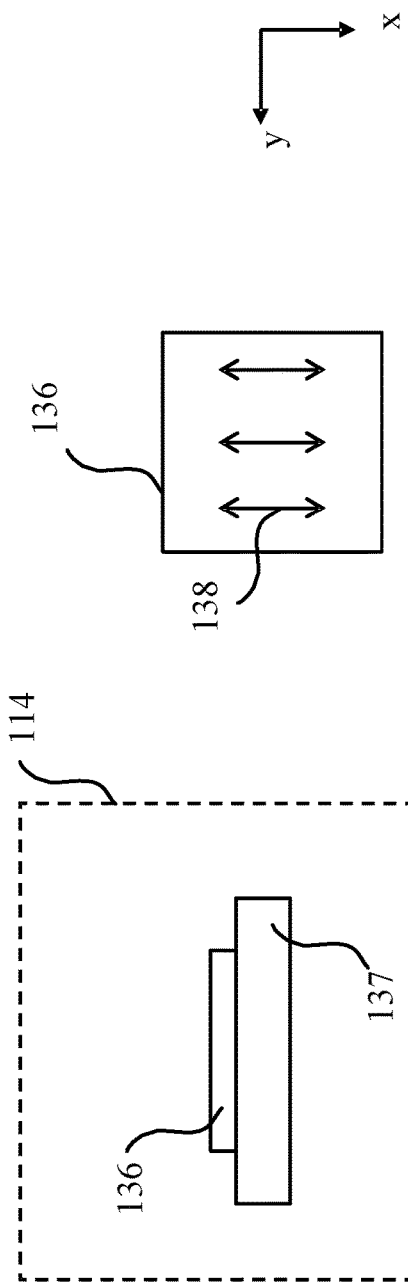
FIG. 6A  FIG. 6B

LIGHT SOURCE APPARATUS AND IMAGE PROJECTION APPARATUS

BACKGROUND OF THE INVENTION

Field of the Invention

The present invention relates generally to a light source apparatus suitable for an image projection apparatus (projector) etc., and more particularly to a light source apparatus using a wavelength conversion element.

Description of the Related Art

As disclosed in Japanese Patent Application Laid-Open No. 2015-106130, some projectors generate fluorescent light by irradiating excitation light from a light source onto a fluorescent body as a wavelength conversion element, project and display an image using combined light of the fluorescent light and the unconverted excitation light that has not undergone the wavelength conversion. Japanese Patent No. 6084572 discloses an illumination device that improves a light utilization efficiency using a quantum rod configured to convert a wavelength of incident light and emits the converted light as linear polarization light.

In the projector disclosed in Japanese Patent Laid-Open No. 2015-106130, the light from the light source is the linear polarization light, but the fluorescent light is the nonpolarized light. Thus, in order to introduce illumination light as the linear polarization light into a light modulation element such as a liquid crystal panel, an illumination optical system that guides the illumination light to the light modulation element needs to include a polarization conversion element that converts the fluorescent light into the linear polarization light.

However, the illumination optical system using the polarization conversion element has small Etendue, and as a spot diameter of the fluorescent body is reduced in accordance with the small Etendue, the illumination efficiency lowers due to the fluorescence saturation (luminance saturation) of the fluorescent body.

SUMMARY OF THE INVENTION

The present invention provides a light source apparatus and an image projection apparatus using the same, each of which can emit linear polarization light and obtain a high illumination efficiency.

A light source apparatus according to one aspect of the present invention includes a light emitting element configured to emit light having a first wavelength band, a polarization separation element configured to separate the light having the first wavelength band into a first linear polarization light and a second linear polarization light having polarization directions different from each other, a wavelength conversion element configured to convert the first linear polarization light into a third linear polarization light having a wavelength band different from the first wavelength band, and a combination element configured to combine the second linear polarization light and the third linear polarization light with each other. Light from the light source apparatus maintains a polarization state and illuminates a light modulation element via an illumination optical system.

A light source apparatus according to another aspect of the present invention includes a first light emitting element configured to emit a first linear polarization light having a first wavelength band, a second light emitting element configured to emit a second linear polarization light having a wavelength band different from that of the first linear polarization light, a first wavelength conversion element configured to convert the first linear polarization light into a third linear polarization light having a wavelength band different from each the first wavelength band and the second wavelength band, a second wavelength conversion element configured to convert the second linear polarization light into a fourth linear polarization light having the same wavelength band as that of the first linear polarization light, and a combination element configured to combine the third linear polarization light and the fourth linear polarization light with each other.

An image projection apparatus according to another aspect of the present invention includes the above light source apparatus, and a light modulation element configured to modulate light from the light source apparatus. The image projection apparatus projects modulated light from the light modulation element onto a projection surface and displays an image.

Further features of the present invention will become apparent from the following description of exemplary embodiments with reference to the attached drawings.

BRIEF DESCRIPTION OF THE DRAWINGS

FIGS. 2A and 2B illustrate a configuration of a first wavelength conversion element according to the first embodiment where excitation light is s-polarized light.

FIGS. 3A and 3B illustrate a configuration of a first wavelength conversion element according to the first embodiment where the excitation light is p-polarized light.

FIGS. 5A and 5B illustrate a configuration of a first wavelength conversion element according to the second embodiment.

FIGS. 6A and 6B illustrate a configuration of a second wavelength conversion element according to the second embodiment.

DESCRIPTION OF THE EMBODIMENTS

Referring now to the accompanying drawings, a description will be given of embodiments according to the present invention.

First Embodiment

Figure 1:
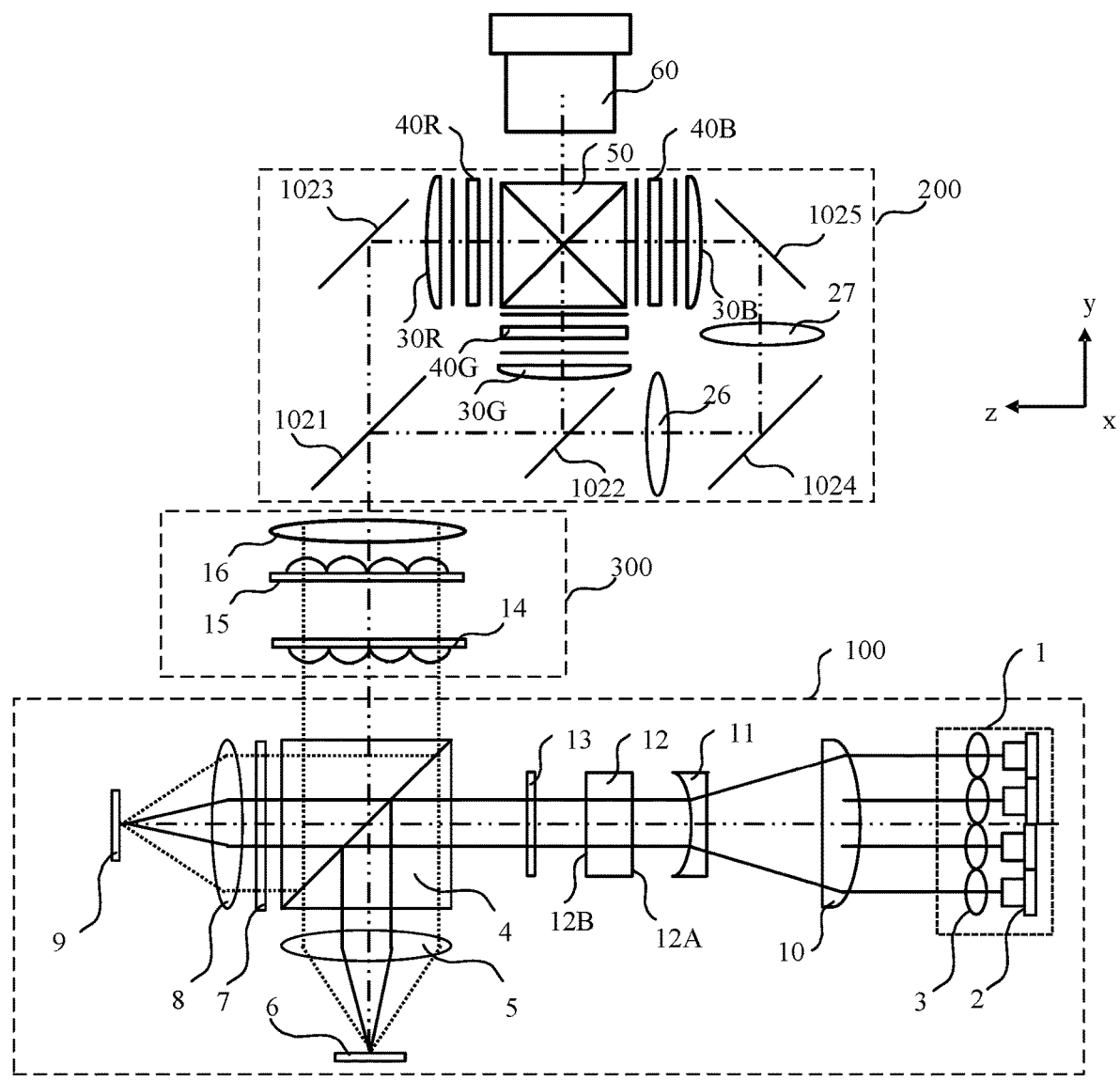
FIG. 1 illustrates a configuration of a projector according to a first embodiment of the present invention.

FIG. 1 illustrates a configuration of a projector as an image projection apparatus according to a first embodiment of the present invention. The projector includes a light source apparatus 100, an illumination optical system 300, a color separation optical system 200, light modulation elements 40R, 40G, and 40B, a cross dichroic prism 50, and a projection optical system 60.

The light source apparatus 100 includes a light source unit 1, a polarization separation and combination element 4, a first collimator lens 5, a wavelength conversion element 6, a first phase plate 7, a second collimator lens 8, and a reflection type diffusion plate 9. The light source apparatus 100 further includes a first lens 10, a second lens 11, a lens array 12, and a second phase plate 13.

The illumination optical system 300 includes a first lens array (fly-eye lens) 14, a second lens array (fly-eye lens) 15, and a condenser lens 16. The first lens array 14 is disposed in a matrix on a plane orthogonal to an optical axis in the illumination optical system 300 and includes a plurality of lens cells that divide the light from the light source apparatus 100 into a plurality of light fluxes.

The second lens array 15 includes a plurality of lens cells arranged in a matrix on a plane orthogonal to the optical axis in the illumination optical system 300 and each corresponding to each of the plurality of lens cells in the first lens array 14. In addition to the condenser lens 16, the second lens array 15 forms images (light source images) of the plurality of lens cells of the first lens array 14 near the light modulation elements 40R, 40G, and 40B.

The condenser lens 16 condenses a plurality of divided light fluxes from the second lens array 15 and superimposes them on each light modulation element. The first lens array 14, the second lens array 15, and the condenser lens 16 constitute an integrator optical system that makes uniform the intensity distribution of light from the light source apparatus 100.

The color separation optical system 200 has dichroic mirrors 1021 and 1022, mirrors 1023, 1024, and 1025, and relay lenses 26 and 27. The color separation optical system 200 separates the white light from the illumination optical system 300 into red light, green light, and blue light, and guides these three color light fluxes to the corresponding light modulation elements 40R, 40G, and 40B.

Condenser lenses 30R, 30G, and 30B are arranged between the color separation optical system 200 and the light modulation elements 40R, 40G, and 40B. The dichroic mirror 1021 has a characteristic of transmitting the red light and of reflecting the green light and the blue light. The dichroic mirror 1022 has a characteristic of reflecting the green light and of transmitting the blue light.

The red light that has passed through the dichroic mirror 1021 is reflected by the mirror 1023, is condensed by the condenser lens 30R, and enters the light modulation element 40R for the red light. The green light reflected by the dichroic mirror 1021 is further reflected by the dichroic mirror 1022, is condensed by the condenser lens 30G, and enters the light modulation element 40G for the green light. The blue light that has transmitted through the dichroic mirror 1022 enters light modulation element 40B for the blue light via the relay lens 26, the incident side mirror 1024, the relay lens 27, the exit side mirror 1025, and the condenser lens 30B.

Each of the light modulation elements 40R, 40G, and 40B modulates the incident color light according to input image information to the projector. FIG. 1 illustrates a transmission type liquid crystal panel as the light modulation elements 40R, 40G, and 40B. However, a reflection type liquid crystal panel or a digital micro mirror device may be used for the light modulation elements. An incident side polarization plate 41 is disposed on the light incident side of the light modulation elements 40R, 40G, and 40B, and an exit side polarization plate 42 is disposed on the light exit side.

The cross dichroic prism 50 combines the modulated light flux (image light flux) from the three light modulation elements 40R, 40G, and 40B and guides them to the projection optical system 60. The cross dichroic prism 50 has a cubic or rectangular parallelepiped shape formed by bonding four right angle prisms, and a dielectric multilayer film on the prism bonding surface. The image light combined by the cross dichroic prism 50 is enlarged and projected onto the projection surface of a screen or the like by the projection optical system 60. Thereby, a full color image is displayed on the projection surface.

In the light source apparatus 100, the light source unit 1 includes a blue laser diode (LD) 2 as a plurality of light emitting elements (light emitters) and a collimator lens 3 provided for each blue LD 2. The blue light emitted from the blue LD 2 is linear polarization light whose polarization direction is aligned with the x direction perpendicular to the sheet of FIG. 1 as well as divergent light, and is collimated by the collimator lens 3.

The blue light (first light) emitted from the light source unit 1 is condensed by the first lens 10, is collimated by the second lens 11, and enters the lens array 12. The lens array 12 has a lens array surface on both sides. The light (parallel light flux) from the second lens 11 enters a first lens array surface 12A of the lens array 12, is split into a plurality of light fluxes, and then enters a second lens array surface 12B. The plurality of divided light fluxes emitted from the second lens array surface 12B pass through a second phase plate 13 and enters a polarization separation and combination element (a polarization separator and combiner) 4 that serves as a polarization separation element (polarization separator) and a combination element (combiner) 4.

The p-polarized light and s-polarized light used in the following description are defined by the polarization direction of a light ray incident on the polarization separation surface in the polarization separation and combination element 4. The s-polarized light in this embodiment and the following other embodiments is linear polarization light whose polarization direction is aligned with the x direction. The second phase plate 13 is an element that controls a ratio of the blue p-polarized light and s-polarized light.

The polarization separation and combination element 4 has a characteristic of reflecting the blue s-polarized light and of transmitting the blue p-polarized light and light in the green to red wavelength band. In other words, the polarization separation and combination element 4 separates the incident blue light into the blue s-polarized light (first linear polarization light) and the blue p-polarized light (second linear polarization light). The blue s-polarized light reflected by the polarization light separation and combination element 4 is condensed by the first collimator lens 5 and enters the wavelength conversion element 6.

FIG. 2A illustrates a configuration of a wavelength conversion element (wavelength converter) 6. The wavelength conversion element 6 includes a first wavelength conversion layer 22 as a first wavelength converter disposed in order from a light incident side which the blue s-polarized light enters, a second wavelength conversion layer 24 as a second wavelength converter, and a reflection member 25 as a substrate. The first wavelength conversion layer 22 and the second wavelength conversion layer 24 are laminated on the reflection member 25. The stacking order of the first wavelength conversion layer 22 and the second wavelength conversion layer 24 may be reversed.

In the first wavelength conversion layer 22, as illustrated in FIG. 2B, a plurality of first quantum rods 21 are arranged such that their longitudinal directions extend in the x direction. The first quantum rod 21 converts the blue linear polarization light whose polarization direction is aligned with the x direction into the red linear polarization light whose polarization direction is aligned with the x direction. In other words, the first quantum rod 21 converts the blue s-polarized light (linear polarization light in the first wavelength band) into the red s-polarized light (linear polarization light in the second wavelength band) while maintaining its polarization direction.

In the second wavelength conversion layer 24, the second quantum rods 23 are arranged such that their longitudinal directions extend in the x direction. The second quantum rod 23 converts the blue linear polarization light whose polarization direction is aligned with the x direction into the green linear polarization light whose polarization direction is aligned with the x direction. In other words, the second quantum rod 21 converts the blue s-polarized light into the green s-polarized light (linear polarization light in the third wavelength band) while maintaining its polarization direction.

The blue s-polarized light which has not undergone the wavelength conversion among the blue s-polarized light incident on the wavelength conversion element 6 as described above is reflected by the reflection member 25 and again its wavelength is converted to generate the red and green s-polarized light by the first and second wavelength conversion layers 22 and 24 (first and second quantum rods 21 and 23). Thus, the green and red s-polarized light fluxes (third linear polarization light fluxes) are emitted from the wavelength conversion element 6. The green and red s-polarized light fluxes emitted from the wavelength conversion element 6 are collimated by the first collimator lens 5 and enter the polarization separation and combination element 4.

This embodiment arranges the quantum rods such that their longitudinal directions extend in the x direction in each wavelength conversion layer, gives each color light directivity in the x direction, and reduces the light flux diameter in the x direction. As a result, the size (height) of the projector is reduced in the x direction.

On the other hand, the blue p-polarized light that has transmitted through the polarization separating and combination element 4 is converted into circular polarization light by the first phase plate 7, is condensed by the second collimator lens 8, and enters a reflection type diffusion plate 9 as a diffusion element (diffusion). The blue circular polarized light diffused and reflected by the reflection type diffusion plate 9 is collimated by the second collimator lens 8 and converted into the s-polarized light by the first phase plate 7. The first phase plate 7 is an element that causes the polarization direction of the blue linear polarization light (second linear polarization light) to coincide with that of each of the green and red linear polarization light fluxes (third linear polarization light flux).

The blue s-polarized light as diffusion light emitted from the first phase plate 7 is reflected by the polarization splitting and combination element 4. This blue s-polarized light is combined with the green and red s-polarized light fluxes that have transmitted through the polarization splitting and combination element 4 to generate white illumination light, which is emitted from the light source apparatus 100 and input to the illumination optical system 300.

This configuration enables the blue, green, and red s-polarized light fluxes to enter the illumination optical system 300 using no polarization conversion element that converts nonpolarized light into linear polarization light. The Etendue of the illumination optical system including the polarization conversion element is small, and if the spot diameter of the excitation light incident on the wavelength conversion element is made small in accordance with the small Etendue, the illumination efficiency decreases due to the fluorescence saturation of the wavelength conversion element. The fluorescence saturation is a phenomenon generated in the fluorescent body and quantum dot (including the quantum rod), in which the conversion efficiency lowers from the excitation light to the fluorescent light as the input energy of excitation light increases. Since the conversion efficiency depends on the light density, when the light density increases, the conversion efficiency decreases.

On the other hand, this embodiment that needs no polarization conversion element has large Etendue in the illumination optical system 300, and suppresses the fluorescence saturation of the wavelength conversion element 6 to improve the illumination efficiency. No polarization conversion element can theoretically double the Etendue of the illumination optical system 300 and maintain the necessary illumination efficiency even if the spot diameter of the excitation light on the wavelength conversion element 6 is doubled and the optical density is halved. Therefore, the conversion efficiency can be prevented from deteriorating due to the fluorescence saturation.

When the output of the blue LD 2 changes, the conversion efficiency also decreases due to the fluorescence saturation. Thereby, the balance changes among the blue light and the red light and the green light as the light having a converted wavelength, and the tint of the illumination light changes. Then, the second phase plate 13 that properly adjusts a ratio between the blue p-polarized light and the s-polarized light can suppress the tint change of the illumination light when the output of the blue LD 2 changes.

This embodiment uses the wavelength conversion element 6 including the quantum rod, but may use any elements other than the quantum rod as long as they are wavelength conversion elements that convert the wavelength of the excitation light as linear polarization light while maintaining the linear polarization light. This is also applied to other embodiments to be described later.

This embodiment has discussed the polarization separation and combination element 4 having a characteristic of reflecting the blue s-polarized light and of transmitting the blue p-polarized light and the light in the green to red wavelength band, but the polarization separation and combination element 4 may have a characteristic of reflecting the blue p-polarized light and of transmitting the blue s-polarized light and the light in the green to red wavelength band. Then, a wavelength conversion element 6' illustrated in FIGS. 3A and 3B may be used so that the wavelength conversion element 6' can convert the wavelength of the transmitted s-polarized blue light to generate the green light and red light.

In the wavelength conversion element 6' illustrated in FIGS. 3A and 3B, the longitudinal directions of the first quantum rods 21 disposed in the first wavelength conversion layer 72 and the second quantum rods 23 disposed in the second wavelength conversion layer 74 extend in the z direction. This wavelength conversion element 6' emits the green and red p-polarized light whose polarization direction is aligned with the z direction. The green and red p-polarized light and the blue p-polarized light that has passed through an unillustrated reflection type diffusion plate and the like are led to the illumination optical system 300.

A description will now be given of conditions suitable for this embodiment.

The wavelength conversion element 6 may include, between the first wavelength conversion layer 22 and the second wavelength conversion layer 24, a dichroic film which transmits the light having the wavelength band from blue to green and reflects the red light. Unless the dichroic film is formed, part of the red light generated in the first wavelength conversion layer 22 passes through the second wavelength conversion layer 24, is reflected by the reflection member 25, again passes through the second wavelength conversion layer 24, and is emitted from the wavelength conversion element 6. Thus, an optical path length difference by the reciprocation through the second wavelength conversion layer 24 occurs between the red light and the green light. This optical path length difference reduces the parallelism of the light beam collimated by the first collimator lens 5, and consequently decreases the illumination efficiency.

Assume that A is a total of light quantities of the blue, green, and red s-polarized light fluxes (second and third linear polarization light beams) out of the light emitted from the light source apparatus 100 and entering the illumination optical system 300, and B is a light quantity of the P-polarized light as unnecessary light. Then, the following condition may be satisfied.

$$A/B \geq 4 \quad (1)$$

If AB falls below a lower limit value, a loss of the illumination light due to the absorption or reflection on the incident side polarizing plate 41 increases and the illumination efficiency decreases. The following condition may be satisfied.

$$A/B \geq 6 \quad (2)$$

The following condition may be satisfied.

$$A/B \geq 9 \quad (3)$$

The following third to fifth embodiments described later may also satisfy the conditions of the expressions (1) to (3).

Second Embodiment

Figure 4:
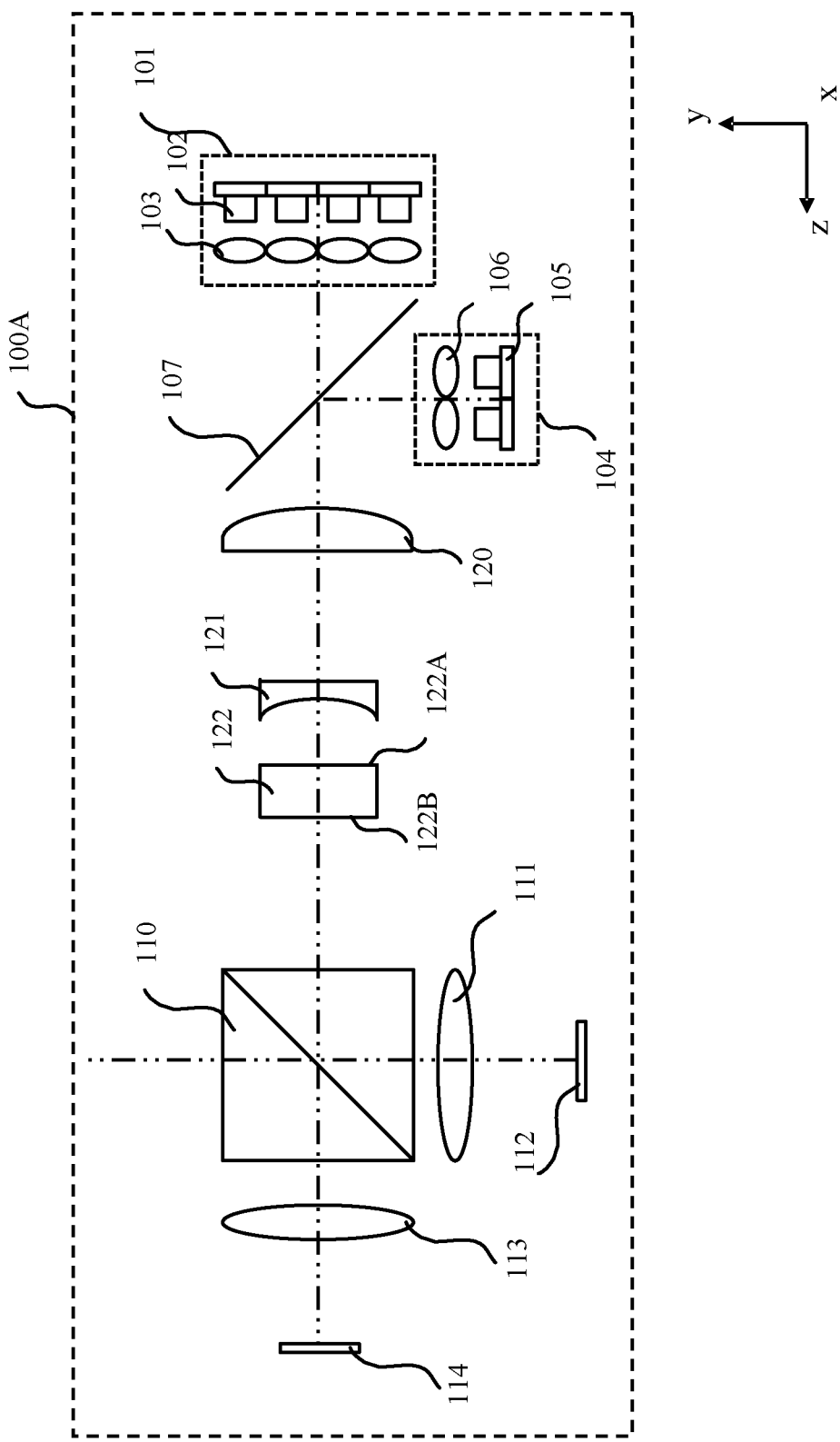
FIG. 4 illustrates a configuration of a light source apparatus in a projector according to a second embodiment of the present invention.

FIG. 4 illustrates a configuration of a light source apparatus 100A in a projector according to a second embodiment of the present invention. The projector according to this embodiment includes a light source apparatus 100A, and other components configured similarly to the first embodiment, such as an illumination optical system, a color separation optical system, a light modulation element (light modulator), a cross dichroic prism, and a projection optical system.

The light source apparatus 100A includes a first light source unit 101, a second light source unit 104, a dichroic mirror 107, a first lens 120, a second lens 121, a lens array 122, and a color separation and combination element (color separator and combiner) 110. The light source apparatus 100A further includes a first collimator lens 111, a first wavelength conversion element 112, a second collimator lens 113, and a second wavelength conversion element 114.

The first light source unit 101 has a blue LD 102 as a plurality of first light emitting elements, and a collimator lens 103 provided for each blue LD 102. The blue light emitted from the blue LD 102 is linear polarization light (s-polarized light) whose polarization direction is aligned with the x direction as well as divergent light, and is collimated by the collimator lens 103.

The second light source unit 104 includes an ultraviolet LD 105 as a plurality of second light emitting elements, and a collimator lens 106 provided for each ultraviolet LD 105. The ultraviolet light emitted from the ultraviolet LD 105 is linear polarization light (s-polarized light) whose polarization direction is aligned with the x direction as well as divergent light, and is collimated by the collimator lens 103.

The blue light (first linear polarization light) emitted from the first light source unit 101 and the ultraviolet light (second linear polarization light) emitted from the second light source unit 104 are combined with each other by the transmission and reflection by the dichroic mirror 107. Then, it is condensed by the first lens 120, is collimated by the second lens 121, and enters the lens array 122. The lens array 122 has a lens array surface on both sides. The light (parallel light flux) from the second lens 121 enters the first lens array surface 122A of the lens array 122, is divided into a plurality of light fluxes, and then these light fluxes enter the second lens array surface 122B. The plurality of divided light fluxes emitted from the second lens array surface 122B enter a color separation and combination element (color separator and combiner) 110 which also serves as a color separation element (color separator) and a combination element (combiner).

The color separation and combination element 110 has a characteristic of reflecting the blue light and of transmitting the ultraviolet light and light having the wavelength band from green to red. In other words, the color separation and combination element 110 separates the blue light and the ultraviolet light combined by the dichroic mirror 107. The blue light reflected by the color separation and combination element 110 is condensed by the first collimator lens 111 and enters the first wavelength conversion element 112.

FIG. 5A illustrates the configuration of the first wavelength conversion element 112. The first wavelength conversion element 112 includes, in order from a light incident side which blue light enters, a first wavelength conversion layer 132 as a first wavelength converter, a second wavelength conversion layer 134 as a second wavelength converter, and a reflection member 135 as a substrate. The first wavelength conversion layer 132 and the second wavelength conversion layer 134 are laminated on the reflection member 135. The stacking order of the first wavelength conversion layer 132 and the second wavelength conversion layer 134 may be reversed.

As illustrated in FIG. 5B, the first wavelength conversion layer 132 has a plurality of first quantum rods 131 such that their longitudinal directions extend in the x direction. The first quantum rod 131 converts the blue linear polarization light whose polarization direction is aligned with the x direction, into the red linear polarization light whose polarization direction is aligned with the x direction. In other words, the first quantum rod 131 converts the blue s-polarized light (first linear polarization light) into the red s-polarized light while maintaining its polarization direction.

The second wavelength conversion layer 134 includes the second quantum rods 133 such that their longitudinal directions extend in the x direction. The second quantum rod 133 converts the blue linear polarization light whose polarization direction is aligned with the x direction, into the green linear polarization light whose polarization direction is aligned with the x direction. In other words, the second quantum rod 131 converts the blue s-polarized light into the green s-polarized light while maintaining its polarization direction.

Part of the blue light which has not undergone the wavelength conversion among the blue light incident on the first wavelength conversion element 112 is reflected by the reflection member 135, and is converted into red and green s-polarized light by the first and second wavelength conversion layers 132 and 134 (first and second quantum rods 131 and 133).

Thus, the wavelength-converted green and red s-polarized light fluxes (third linear polarization light fluxes) from the blue s-polarized light is emitted from the first wavelength conversion element 112. The green and red s-polarized light fluxes emitted from the first wavelength conversion element 112 are collimated by the first collimator lens 111 and enter the color separation and combination element 110.

On the other hand, the ultraviolet light that has transmitted through the color separation and combination element 110 is condensed by the second collimator lens 113 and enters the second wavelength conversion element 114. FIG. 6A illustrates the configuration of the second wavelength conversion element 114. The second wavelength conversion element 114 includes, in this order from the light incident side which the ultraviolet light enters, a third wavelength conversion layer 136 as a third wavelength converter and a reflection member 137 as a substrate.

The third wavelength conversion layer 136 includes, as illustrated in FIG. 6B, a plurality of third quantum rods 138 such that their longitudinal directions extend in the x direction. The third quantum rod 138 converts the ultraviolet linear polarization light whose polarization direction is aligned with the x direction, into the blue linear polarization light whose polarization direction is aligned with the x direction. In other words, the third quantum rod 138 converts the ultraviolet s-polarized light (second linear polarization light), into the blue s-polarized light (fourth linear polarization light) while maintaining its polarization direction.

The ultraviolet s-polarized light which has not undergone the wavelength conversion as described above among the ultraviolet s-polarized light incident on the second wavelength conversion element 114 is reflected by the reflection member 137 and its wavelength is again converted by the third wavelength conversion layer 136 (third quantum rod 138) into the blue s-polarized light. Thus, the blue s-polarized light is emitted from the second wavelength conversion element 114. The blue s-polarized light emitted from the second wavelength conversion element 114 is collimated by the second collimator lens 113 and reflected by the color separation and combination element 110. This blue s-polarized light is combined with the green and red s-polarized light fluxes that have transmitted through the color separation and combination element 110, so that the white illumination light is generated. The illumination light is emitted from the light source apparatus 100A and enters the illumination optical system.

This configuration enables the blue, green, and red s-polarized light to enter the illumination optical system using no polarization conversion element that converts the nonpolarized light into the linear polarization light. As a result, the Etendue of the illumination optical system becomes large, so that the fluorescence saturation of the first and second wavelength conversion elements 112 and 114 can be reduced and the illumination efficiency can be improved.

Assume that A is a total of light quantities of the blue, green and red s-polarized light fluxes (third and fourth linear polarization light fluxes) among the light emitted from the light source apparatus 100A and entering the illumination optical system in this embodiment, and B is a light quantity of the p-polarized light as unnecessary light. Then, the expressions (1) to (3) described in the first embodiment may be satisfied. This is also applied to the fourth embodiment described later.

The first quantum rod disposed in the first wavelength conversion layer and the second quantum rod disposed in the second wavelength conversion layer have longitudinal directions extending in the z direction. The third quantum rod disposed in the second wavelength conversion layer has a longitudinal direction extending in the y direction. Then, the green, red, and blue p-polarized light are guided to the illumination optical system by causing the blue light and the ultraviolet light whose polarization directions are aligned with the z direction to enter the color separation and combination element 110.

Third Embodiment

Figure 7:
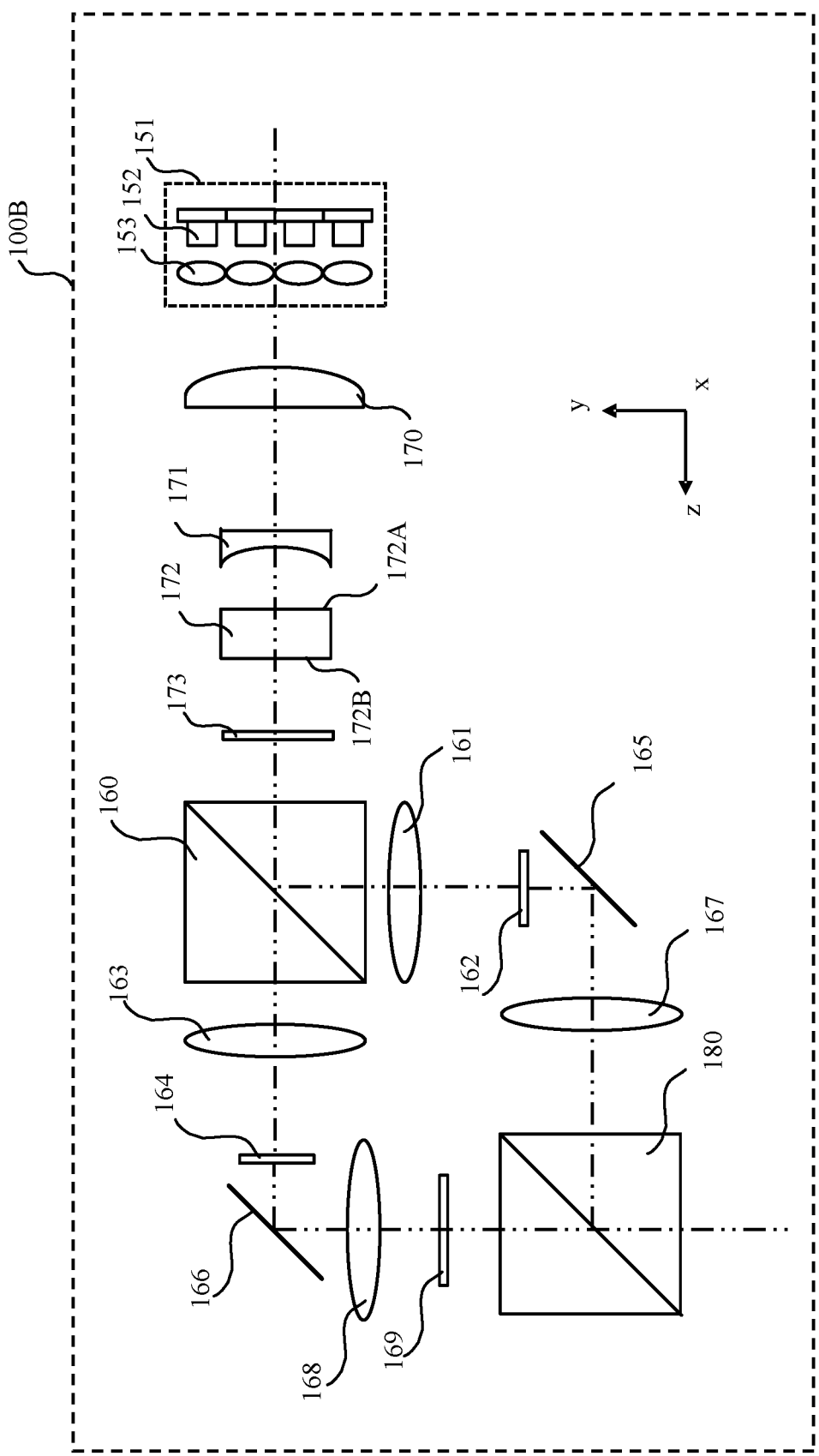
FIG. 7 illustrates a configuration of a light source apparatus in a projector according to a third embodiment of the present invention.

FIG. 7 illustrates a configuration of a light source apparatus 100B in a projector according to a third embodiment of the present invention. The projector according to this embodiment includes a light source apparatus 100B, and other components configured similarly to the first embodiment, such as an illumination optical system, a color separation optical system, a light modulation element, a cross dichroic prism, and a projection optical system.

The light source apparatus 100B includes a light source unit 151, a first lens 170, a second lens 171, a lens array 172, a second phase plate 173, a polarization separation element 160, a first collimator lens 161, and a wavelength conversion element 162. The light source apparatus 100B includes a first mirror 165, a second collimator lens 167, and a combination element 180. The light source apparatus 100B includes a third collimator lens 163, a transmission type diffusion plate 164, a second mirror 166, a fourth collimator lens 168, and a first phase plate 169.

The light source unit 151 includes a blue LD 152 as a plurality of light emitting elements, and a collimator lens 153 provided for each blue LD 152. The blue light emitted from the blue LD 152 is linear polarization light (s-polarized light) whose polarization direction is aligned with the x direction as well as divergent light, and it is collimated by the collimator lens 153.

The blue light emitted from the light source unit 101 is condensed by the first lens 170, is collimated by the second lens 171, and enters the lens array 172. The lens array 172 has a lens array surface on both sides. The light (parallel light flux) from the second lens 171 enters the first lens array surface 172A of the lens array 172, is divided into a plurality of light fluxes, and then the light fluxes enters the second lens array surface 172B. The plurality of divided light fluxes emitted from the second lens array surface 172B pass through the second phase plate 173 and enter the polarization separation element 160. The second phase plate 173 is an element that controls a ratio between the blue p-polarized light and the s-polarized light.

The polarization separation element 160 has a characteristic of reflecting the blue s-polarized light and of transmitting the blue p-polarized light. In other words, the polarization separation element 160 separates the incident blue light into the blue s-polarized light (first linear polarization light) and the blue p-polarized light (second linear polarization light). The blue s-polarized light reflected by the polarization separating element 160 is condensed by the first collimator lens 161 and enters the wavelength conversion element 162.

Figure 8:
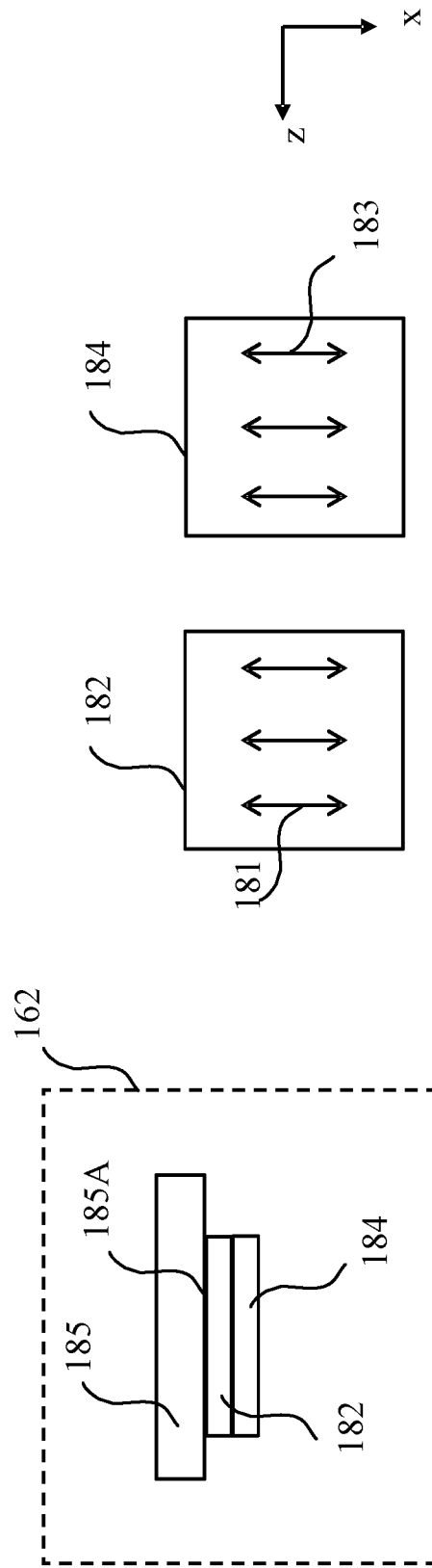
FIGS. 8A and 8B illustrate a configuration of a first wavelength conversion element according to the third embodiment.

FIG. 8A illustrates the configuration of the wavelength conversion element 162. The wavelength conversion element 162 includes, in this order from the light incidence side which the blue s-polarized light enters, a light transmitting member 185 as a substrate, a first wavelength conversion layer 182 as a first wavelength converter, and a second wavelength conversion layer 184 as a second wavelength converter. The first wavelength conversion layer 182 and the second wavelength conversion layer 184 are stacked on the light transmitting member 185. The stacking order of the first wavelength conversion layer 182 and the second wavelength conversion layer 184 may be reversed.

The first wavelength conversion layer 182 includes, as illustrated in FIG. 8B, a plurality of first quantum rods 181 such that their longitudinal directions extend in the x direction. The first quantum rod 181 converts the blue linear polarization light whose polarization direction is aligned with the x direction, into the red linear polarization light whose polarization direction is aligned with the x direction. In other words, the first quantum rod 181 converts the blue linear polarization light (linear polarization light in the first wavelength band) into the red linear polarization light (linear polarization light in the second wavelength band) while maintaining its polarization direction.

The second wavelength conversion layer 184 includes the second quantum rods 183 such that their longitudinal directions extend in the x direction. The second quantum rod 183 converts the blue linear polarization light whose polarization direction is aligned with the x direction into the green linear polarization light whose polarization direction is aligned with the x direction. In other words, the second quantum rod 183 converts the blue s-polarized light into the green s-polarized light (linear polarization light in the third wavelength band) while maintaining its polarization direction.

A dichroic film is formed at an interface 185A of the light transmitting member 185 with the first wavelength conversion layer 182. The dichroic film has a characteristic of transmitting the blue light and of reflecting the light in the wavelength band from green to red.

This configuration emits the green and red s-polarized light from the wavelength conversion element 162. The green and red s-polarized light fluxes emitted from the wavelength conversion element 162 are reflected by the first mirror 165, collimated by the second collimator lens 167, and reflected by the combination element 180. The combination element 180 has a characteristic of reflecting the blue light and of transmitting the light in the wavelength band from green to red.

On the other hand, the blue p-polarized light that has transmitted through the wavelength separation element 160 is condensed by the third collimator lens 163 and enters the transmission type diffusion plate 164. The blue p-polarized light diffused by the transmission type diffusion plate 164 is reflected by the second mirror 166, collimated by the fourth collimator lens 168, and converted into the s-polarized light by the first phase plate 169. The first phase plate 169 is an element that aligns the polarization direction of the blue linear polarization light (second linear polarization light) with that of the green and red linear polarization light (third linear polarization light).

The blue s-polarized light emitted from the first phase plate 169 passes through the combination element 180 and is reflected by the combination element 180. This blue s-polarized light is combined with the green and red s-polarized light fluxes that have transmitted through the combination element 180 to generate white illumination light, and the illumination light is emitted from the light source apparatus 100B and enters the illumination optical system.

This configuration enables the blue, green, and red s-polarized light to enter the illumination optical system using no polarization conversion element that converts the nonpolarized light into the linear polarization light. As a result, the Etendue of the illumination optical system becomes larger, so that the fluorescence saturation of the wavelength conversion element 162 can be reduced, and the illumination efficiency can be improved.

Fourth Embodiment

Figure 9:
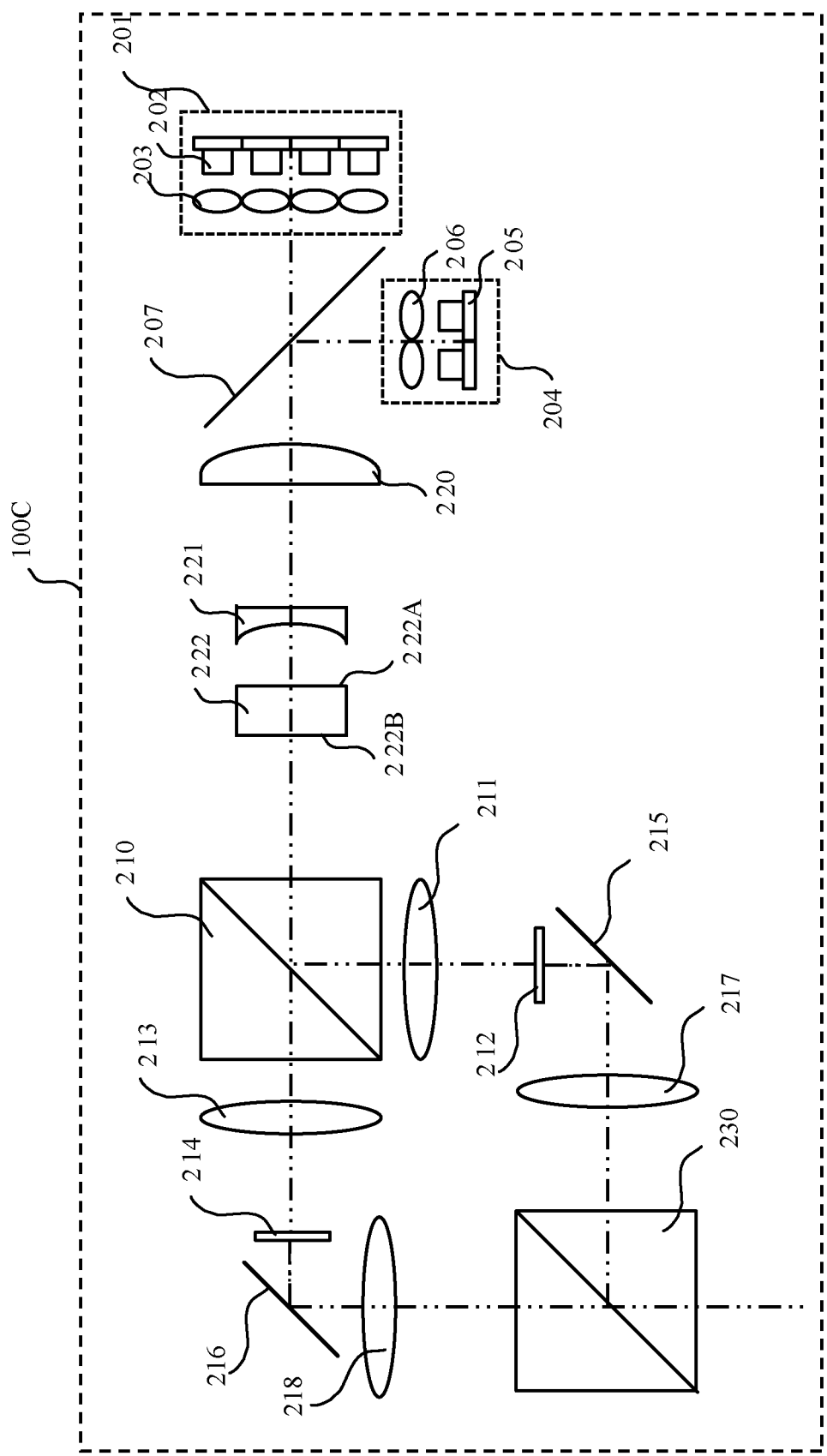
FIG. 9 illustrates a configuration of a light source apparatus in a projector according to a fourth embodiment of the present invention.

FIG. 9 illustrates a configuration of a light source apparatus 100C in a projector according to a fourth embodiment of the present invention. The projector according to this embodiment includes a light source apparatus 100C, and other components configured similarly to the first embodiment, such as an illumination optical system, a color separation optical system, a light modulation element, a cross dichroic prism, and a projection optical system.

The light source apparatus 100C includes a first light source unit 201, a second light source unit 204, a dichroic mirror 207, a first lens 220, a second lens 221, a lens array 222, and a color separation element 210. The light source apparatus 100C further includes a first mirror 265, a second collimator lens 217, and a combination element 230. The light source apparatus 100C further includes a third collimator lens 213, a second wavelength conversion element 214, a second mirror 216, and a fourth collimator lens 218.

The first light source unit 201 has a blue LD 202 as a plurality of first light emitting elements, and a collimator lens 203 provided for each blue LD 202. The blue light emitted from the blue LD 202 is linear polarization light (s-polarized light) whose polarization direction is aligned with the x direction as well as divergent light, and is collimated by the collimator lens 203.

The second light source unit 204 includes an ultraviolet LD 205 as a plurality of second light emitting elements, and a collimator lens 206 provided for each ultraviolet LD 205. The ultraviolet light emitted from the ultraviolet LD 205 is linear polarization light (s-polarized light) whose polarization direction is aligned with the x direction as well as divergent light, and is collimated by the collimator lens 203.

The blue light (first linear polarization light) emitted from the first light source unit 201 and the ultraviolet light (second linear polarization light) emitted from the second light source unit 204 are combined with each other by the transmission and reflection by the dichroic mirror 207. The light is condensed by the first lens 220, is collimated by the second lens 221, and enters the lens array 222. The lens array 222 has a lens array surface on both sides. The light (parallel light beam) from the second lens 221 enters the first lens array surface 222A of the lens array 222, is divided into a plurality of light fluxes, and then these light fluxes enters the second lens array surface 222B. The plurality of divided light fluxes emitted from the second lens array surface 222B enter the color separation element 210.

The color separation element 210 has a characteristic of reflecting the blue light and of transmitting the ultraviolet light. In other words, the color separation element 210 separates the blue light and the ultraviolet light that have been combined with each other by the dichroic mirror 207. The blue light reflected by the color separation element 210 is condensed by the first collimator lens 211 and enters the first wavelength conversion element 212. The configuration of the first wavelength converting element 212 is the same as that of the first wavelength converting element 162 according to the third embodiment, and the first wavelength converting element 212 converts the incident blue s-polarized light into the green and red s-polarized light (third linear polarization light) while maintaining its polarization direction.

The green and red s-polarized light fluxes emitted from the first wavelength conversion element 212 are reflected by the first mirror 215, are collimated by the second collimator lens 217, are reflected by the combination element 230, and enter the illumination optical system. The combination element 230 has a characteristic of reflecting the blue light and of transmitting the light in the wavelength band from green to red.

Figure 10A:
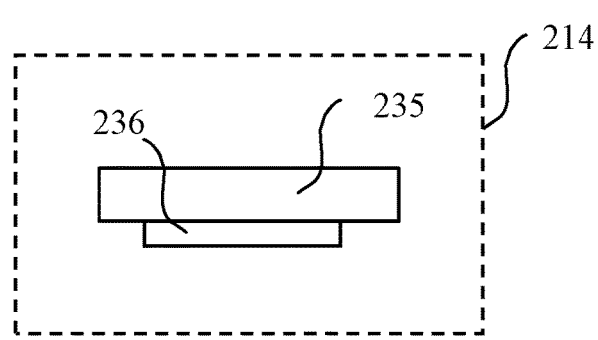
FIGS. 10A and 10B illustrate a configuration of a second wavelength conversion element according to the fourth embodiment.

On the other hand, the blue p-polarized light that has transmitted through the color separation element 210 is condensed by the third collimator lens 213 and enters the second wavelength conversion element 214. FIG. 10A illustrates the configuration of the second wavelength conversion element 214. The second wavelength conversion element 214 includes, in order from the light incident side which the ultraviolet light enters, a light transmitting member 235 as a substrate, and a third wavelength conversion layer 236 as a third wavelength converter.

Figure 10B:
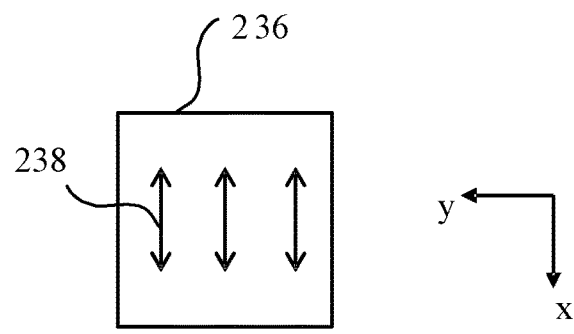

The third wavelength conversion layer 236 includes, as illustrated in FIG. 10B, a plurality of third quantum rods 238 such that their longitudinal directions extend in the x direction. The third quantum rod 238 converts the ultraviolet linear polarization light whose polarization direction is aligned with the x direction, into the blue linear polarization light whose polarization direction is aligned with the x direction. In other words, the third quantum rod 238 converts the ultraviolet s-polarized light (second linear polarization light) into the blue s-polarized light (fourth linear polarization light) while maintaining its polarization direction.

The blue s-polarized light emitted from the second wavelength conversion element 114 is collimated by the second collimator lens 113 and transmits through the combination element 230. Then, this blue S-polarized light is combined with the green and red s-polarized light fluxes reflected by the combination element 110 to generate white illumination light, and the illumination light is emitted from the light source apparatus 100C to the illumination optical system.

This configuration enables the blue, green, and red s-polarized light to enter the illumination optical system using no polarization conversion element that converts the nonpolarized light into the linear polarization light. As a result, the Etendue of the illumination optical system becomes large, and the fluorescence saturation of the first and second wavelength conversion elements 212 and 214 can be reduced, so that the illumination efficiency can be improved.

Fifth Embodiment

Figure 11:
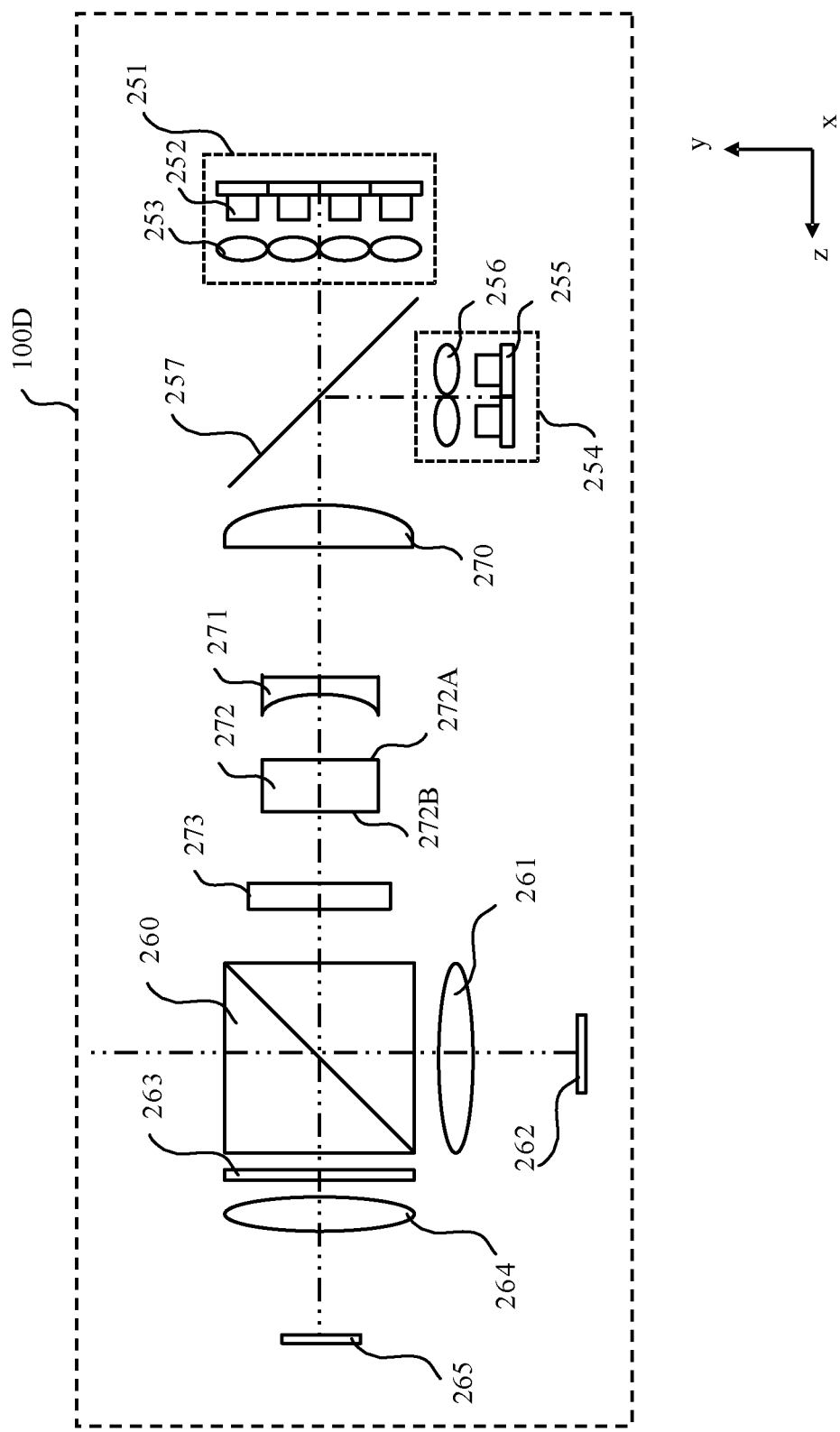
FIG. 11 illustrates a configuration of a light source apparatus in a projector according to a fifth embodiment of the present invention.

FIG. 11 illustrates a configuration of a light source apparatus 100D in a projector according to a fifth embodiment of the present invention. The projector according to this embodiment includes a light source apparatus 100D, and other components configured similarly to the first embodiment, such as an illumination optical system, a color separation optical system, a light modulation element, a cross dichroic prism, and a projection optical system.

The light source apparatus 100D includes a first light source unit 251, a second light source unit 254, a dichroic mirror 257, a first lens 270, a second lens 271, a lens array 272, a wavelength selective phase plate 273, and a polarization and color separation combination element 110. The light source apparatus 100D further includes a first collimator lens 261, a wavelength conversion element 262, a phase plate 263, a second collimator lens 264, and a reflection type diffusion plate 265.

The first light source unit 251 includes a blue LD 252 as a plurality of first light emitting elements, and a collimator lens 253 provided for each blue LD 252. The blue light emitted from the blue LD 252 is linear polarization light (s-polarized light) whose polarization direction is aligned with the x direction as well as divergent light, and is collimated by the collimator lens 253.

The second light source unit 254 has a red LD 255 as a plurality of second light emitting elements, and a collimator lens 256 provided for each red LD 255. The red light emitted from the red LD 255 is linear polarization light (P polarized light) whose polarization direction is aligned with the z direction as well as divergent light, and is collimated by the collimator lens 256.

The blue light emitted from the first light source unit 251 and the red light emitted from the second light source unit 254 are combined with each other by the transmission and reflection by the dichroic mirror 257 and condensed by the first lens 270. The combined light (light in the first wavelength band) of the blue light and the red light is collimated by the second lens 271 and enters the lens array 272. The lens array 272 has a lens array surface on both sides. The light (parallel light beam) from the second lens 271 enters the first lens array surface 272A of the lens array 272, is divided into a plurality of light beams, and then these light beams enter the second lens array surface 272B. The plurality of divided light fluxes emitted from the second lens array surface 272B pass through the wavelength selective phase plate 273 and enter a polarization, color separation, and combination element 260 as a polarization separation element.

The wavelength selective phase plate 273 rotates part of the polarization direction of the incident blue light (s-polarized light) by 90° to align it with the z direction (or generates the blue p-polarized light) and transmits the red light (p-polarized light) as it is. The wavelength selective phase plate 273 is an element that controls the ratio between the p-polarized light and the s-polarized light contained in the blue light.

The polarization, color separation, combination element 260 has a characteristic of reflecting the blue and red s-polarized light fluxes, of transmitting blue and red p-polarized light fluxes, and of further transmitting the green light. In other words, the polarization, color separation, and combination element 260 separates the incident blue light and red light into the blue s-polarized light (first linear polarization light) and blue and red p-polarized light (second linear polarization light). The blue s-polarized light reflected by the polarization, color separation, and combination element 260 is condensed by the first collimator lens 261 and enters the wavelength conversion element 262.

Figure 12A:
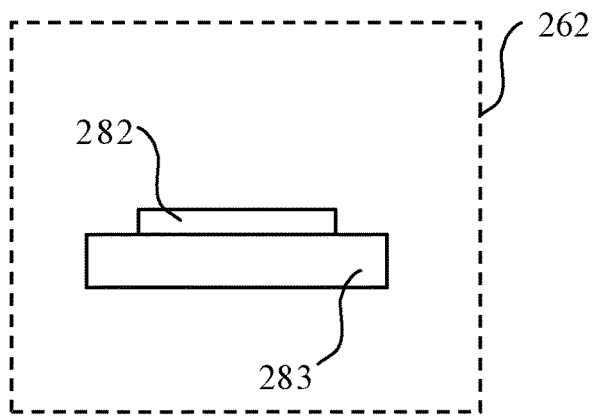
FIGS. 12A and 12B illustrate a configuration of a first wavelength conversion element in the fifth embodiment.
Figure 12B:
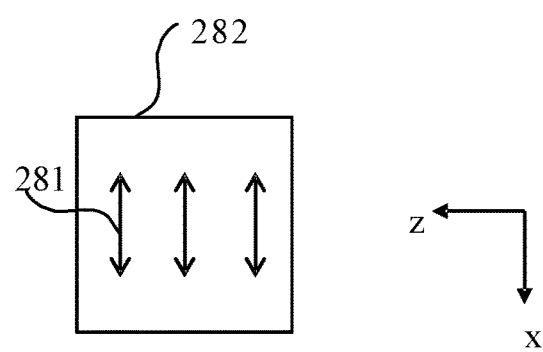

FIG. 12A illustrates a configuration of the wavelength conversion element 262. The wavelength conversion element 262 includes, in order from the light incident side which the s-polarized blue light enters, a wavelength conversion layer 282 and a reflection member 283 as a substrate. The wavelength conversion layer 282 includes, as illustrated in FIG. 12B, a plurality of quantum rods 281 such that their longitudinal directions extend in the x direction. The quantum rod 281 converts the blue linear polarization light whose polarization direction is aligned with the x direction, into the green linear polarization light whose polarization direction is aligned with the x direction. In other words, the quantum rod 21 converts the blue s-polarized light (first linear polarization light) into the green s-polarized light (third linear polarization light) while maintaining its polarization direction. The green s-polarized light emitted from the wavelength conversion element 262 is collimated by the first collimator lens 261 and enters the polarization, color separation, and combination element 260.

On the other hand, the blue and red p-polarized light fluxes that have transmitted through the polarization, color separation, and combination element 260 are converted into circular polarization light by the phase plate 263, are condensed by the second collimator lens 264, and enter the reflection type diffusion plate 265. The blue and red circular polarization light fluxes diffused and reflected by the reflection type diffusion plate 265 are collimated again by the second collimator lens 264 and converted into the s-polarized light by the phase plate 263. The phase plate 263 is an element that causes the polarization directions of the blue and red linear polarization light fluxes (second linear polarization light fluxes) to coincide with the polarization direction of the green linear polarization light (third linear polarization light).

The blue and red s-polarized light fluxes as diffusion light fluxes emitted from the phase plate 263 are reflected by the polarization, color separation, and combination element 260. The blue and red s-polarized light fluxes are combined with the green s-polarized light that has transmitted through the polarization, color separation, and combination element 260 to generate white illumination light, which is emitted from the light source apparatus 100D to the illumination optical system 300.

This configuration enables the blue, green, and red s-polarized light fluxes to enter the illumination optical system using no polarization conversion element that converts the nonpolarized light into the linear polarization light. As a result, the Etendue of the illumination optical system becomes large, and the fluorescence saturation of the wavelength conversion element 262 can be reduced to improve the illumination efficiency.

As described in the first embodiment, when the output of the blue LD 252 changes, the conversion efficiency decreases due to the fluorescence saturation, and the tint of the illumination light changes. On the other hand, this embodiment properly adjusts the ratio between the blue p-polarized light and the s-polarized light by the wavelength selective phase plate 273, properly adjusts the output of the red LD 255, and thereby suppress the tint change in the illumination light caused by the output change of the blue LD 252.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-75096, filed on Apr. 10, 2018, which is hereby incorporated by reference herein in its entirety.

What is claimed is:

1. A light source apparatus comprising:
   a light emitting element configured to emit light having a first wavelength band;
   a polarization separation element configured to separate the light having the first wavelength band into a first linear polarization light and a second linear polarization light having polarization directions different from each other;
   a wavelength conversion element configured to convert the first linear polarization light into a third linear polarization light having a wavelength band different from the first wavelength band;
   a combination element configured to combine the second linear polarization light and the third linear polarization light with each other; and
   a phase plate configured to align the polarization direction of the second linear polarization light and that of the third linear polarization light with each other.

2. The light source apparatus according to claim 1, wherein the wavelength conversion element includes a quantum rod.

3. The light source apparatus according to claim 1, wherein the third linear polarization light is a linear polarization light having the same polarization direction as that of the first linear polarization light, and
   wherein the phase plate converts the polarization direction of the second linear polarization light into the same polarization direction as that of the third linear polarization light.

4. The light source apparatus according to claim 1, wherein the wavelength conversion element includes:
   a first wavelength converter configured to convert the first linear polarization light into a linear polarization light having a second wavelength band different from the first wavelength band; and
   a second wavelength converter configured to convert the first linear polarization light into a linear polarization light having a third wavelength band different from each of the first wavelength band and the second wavelength band, and
   wherein the wavelength conversion element emits as the third linear polarization light the linear polarization light having the second and third wavelength bands.

5. The light source apparatus according to claim 4, wherein the first wavelength converter and the second wavelength converter are stacked in the wavelength conversion element.

6. The light source apparatus according to claim 1, wherein the following condition is satisfied:

$$A/B \geq 4$$

where A is a total of light quantities of the second linear polarization light and the third linear polarization light out of the light emitted from the light source apparatus and B is a light quantity of light having a polarization direction different from that of each of the second linear polarization light and the third linear polarization light.

7. The light source apparatus according to claim 1, wherein the polarization separation element serves as the combination element.

8. The light source apparatus according to claim 1, further comprising a diffusion element configured to diffuse the second linear polarization light.

9. The light source apparatus according to claim 1, further comprising a diffusion element configured to diffuse the second linear polarization light,
   wherein the phase plate is provided between the diffusion element and the polarization separation element.

10. A light source apparatus comprising:
    a first light emitting element configured to emit a first linear polarization light having a first wavelength band;

a second light emitting element configured to emit a second linear polarization light having a wavelength band different from that of the first linear polarization light;

a first wavelength conversion element configured to convert the first linear polarization light into a third linear polarization light having a wavelength band different from each the first wavelength band and the second wavelength band;

a second wavelength conversion element configured to convert the second linear polarization light into a fourth linear polarization light having the same wavelength band as that of the first linear polarization light; and a combination element configured to combine the third linear polarization light and the fourth linear polarization light with each other.

11. The light source apparatus according to claim 10, wherein each of the first wavelength conversion element and the second wavelength conversion element includes a quantum rod.

12. The light source apparatus according to claim 10, wherein the first wavelength conversion element includes:

a first wavelength converter configured to convert the first linear polarization light into a linear polarization light having a second wavelength band different from the first wavelength band; and a second wavelength converter configured to convert the first linear polarization light into a linear polarization light having a third wavelength band different from each of the first wavelength band and the second wavelength band, and wherein the wavelength conversion element emits as the third linear polarization light the linear polarization light having the second and third wavelength bands.

13. The light source apparatus according to claim 12, wherein the first wavelength converter and the second wavelength converter are stacked in the first wavelength conversion element.

14. The light source apparatus according to claim 10, wherein the following condition is satisfied:

$A/B \geq 4$ where A is a total of light quantities of the second linear polarization light and the third linear polarization light out of the light emitted from the light source apparatus and B is a light quantity of light having a polarization direction different from that of each of the second linear polarization light and the third linear polarization light.

15. The light source apparatus according to claim 10, wherein the combination element serves as a color separation element configured to separate the first linear polarization light and the second linear polarization light that have been combined and incident, into the first linear polarization light traveling to the first wavelength conversion element and the second linear polarization light traveling to the second wavelength conversion element.

16. An image projection apparatus comprising:
a light source apparatus; and
a light modulation element configured to modulate light from the light source apparatus,
wherein the image projection apparatus projects modulated light from the light modulation element onto a projection surface and displays an image,
wherein the light source apparatus includes:
a light emitting element configured to emit light having a first wavelength band;
a polarization separation element configured to separate the light having the first wavelength band into a first linear polarization light and a second linear polarization light having polarization directions different from each other;
a wavelength conversion element configured to convert the first linear polarization light into a third linear polarization light having a wavelength band different from the first wavelength band;
a combination element configured to combine the second linear polarization light and the third linear polarization light with each other; and
a phase plate configured to align the polarization direction of the second linear polarization light and that of the third linear polarization light with each other,
wherein a polarization direction of the light from the light source apparatus and a polarization direction of light that illuminates the light modulation element are the same.

17. An image projection apparatus comprising:
a light source apparatus; and
a light modulation element configured to modulate light from the light source apparatus,
wherein the image projection apparatus projects modulated light from the light modulation element onto a projection surface and displays an image,
wherein the light source apparatus includes:
a first light emitting element configured to emit a first linear polarization light having a first wavelength band;
a second light emitting element configured to emit a second linear polarization light having a wavelength band different from that of the first linear polarization light;
a first wavelength conversion element configured to convert the first linear polarization light into a third linear polarization light having a wavelength band different from each the first wavelength band and the second wavelength band;
a second wavelength conversion element configured to convert the second linear polarization light into a fourth linear polarization light having the same wavelength band as that of the first linear polarization light; and
a combination element configured to combine the third linear polarization light and the fourth linear polarization light with each other.

* * * * *